United States Patent [19]

Brasseur

[11] Patent Number: 5,555,668
[45] Date of Patent: Sep. 17, 1996

[54] METHOD AND DEVICE FOR LOCATING BAIT AT DESIRED DEPTH WHILE FISHING

[76] Inventor: Bernard P. Brasseur, HCR 75, Box 86, Cornish, N.H. 03745

[21] Appl. No.: 421,686

[22] Filed: Apr. 13, 1995

[51] Int. Cl.⁶ .................................................. A01K 93/00
[52] U.S. Cl. ........................ 43/43.15; 43/43.1; 43/42.74
[58] Field of Search ................... 43/43.15, 43.1, 43/42.74

[56] References Cited

U.S. PATENT DOCUMENTS

| | | | |
|---|---|---|---|
| 2,157,819 | 5/1939 | Eckhert et al. | 43/43.15 |
| 3,140,520 | 7/1964 | Marino et al. | 43/43.15 X |
| 3,160,979 | 12/1964 | Bissell | 43/43.1 X |
| 4,727,676 | 3/1988 | Runyan | 43/43.1 |
| 5,014,459 | 5/1991 | Sublet | 43/43.1 X |
| 5,113,614 | 5/1992 | Morita | 43/42.74 |
| 5,253,447 | 10/1993 | Rhinehart | 43/42.74 |
| 5,303,499 | 4/1994 | Miller | 43/43.15 |

Primary Examiner—Joseph J. Hail, III
Assistant Examiner—Jay A. Stelacone
Attorney, Agent, or Firm—Davis, Bujold & Streck

[57] ABSTRACT

The bait locating device for accurately positioning bait adjacent a particular fish to be caught. The device comprises a floatation member for causing desired floatation of the device, an attachment member for attaching the device to a suitable weighted member, via fishing line, to drag or sink the device to the bottom of the body of water and a spacer for spacing the bait a sufficient distance away from the floatation member. A method of locating bait adjacent fish is also disclosed in this application.

19 Claims, 3 Drawing Sheets

METHOD AND DEVICE FOR LOCATING BAIT AT DESIRED DEPTH WHILE FISHING

FIELD OF THE INVENTION

This invention relates to a method and apparatus for facilitating accurate location of bait while fishing in a lake, river, or some other body of water.

BACKGROUND OF THE INVENTION

A variety of lures and other fishing devices have been proposed to assist a fisherman with catching a particular kind of fish. However, heretofore, none of such lures or fishing devices facilitate proper and accurate positioning of the bait at a specific location above the bottom of the body of water where the particular fish to be caught is located.

SUMMARY OF THE INVENTION

Wherefore, it is an object of the present invention to provide a bait locating device which facilitates proper location of the bait adjacent the fish to be caught.

A still further objection of the invention is to properly locate the bait while still ensuring that the fisherman will be able to sense when the bait is grabbed or otherwise taken by the fish.

Yet another objection of the invention is to provide a device which readily facilitates adjustment of the exact location of the bait above the bottom of the body of water so that the location of the bait may be varied to accommodate the swimming movement of the fish to be caught.

In particular, the present invention relates to a bait locating device for facilitating positioning of bait at a desired distance from a bottom of a body of water, said bait locating device comprising a floatation member for providing desired buoyancy to said bait locating device; an attachment member being securing to said floatation member, said attachment member facilitating attachment of said bait locating device to a desired weighted member for sinking said bait locating device toward the bottom of the body of water; and a spacer having a first portion attached to said floatation member and a second portion extending away from said floatation member, said second portion having means which are engagable with a fishing line for spacing the fishing line from said floatation member, during use.

The present invention also relates to a method of facilitating positioning of bait at a desired distance from a bottom of a body of water, said method comprising the steps of providing bait locating device with a floatation member for supplying desired buoyancy of said bait locating device; securing an attachment member to said floatation member; attaching a desired weighted member to said attachment member for sinking said bait locating device toward the bottom of the body of water; connecting a first portion of a spacer to said floatation member and extending a second portion of the spacer away from said floatation member; and engaging at least said second portion of the spacer with a fishing line for spacing the fishing line from said floatation member, during use.

BRIEF DESCRIPTION OF THE DRAWINGS

The invention will now be described, by way of example, with reference to the accompanying drawings in which.

DESCRIPTION OF THE PREFERRED EMBODIMENTS

Figure 1:
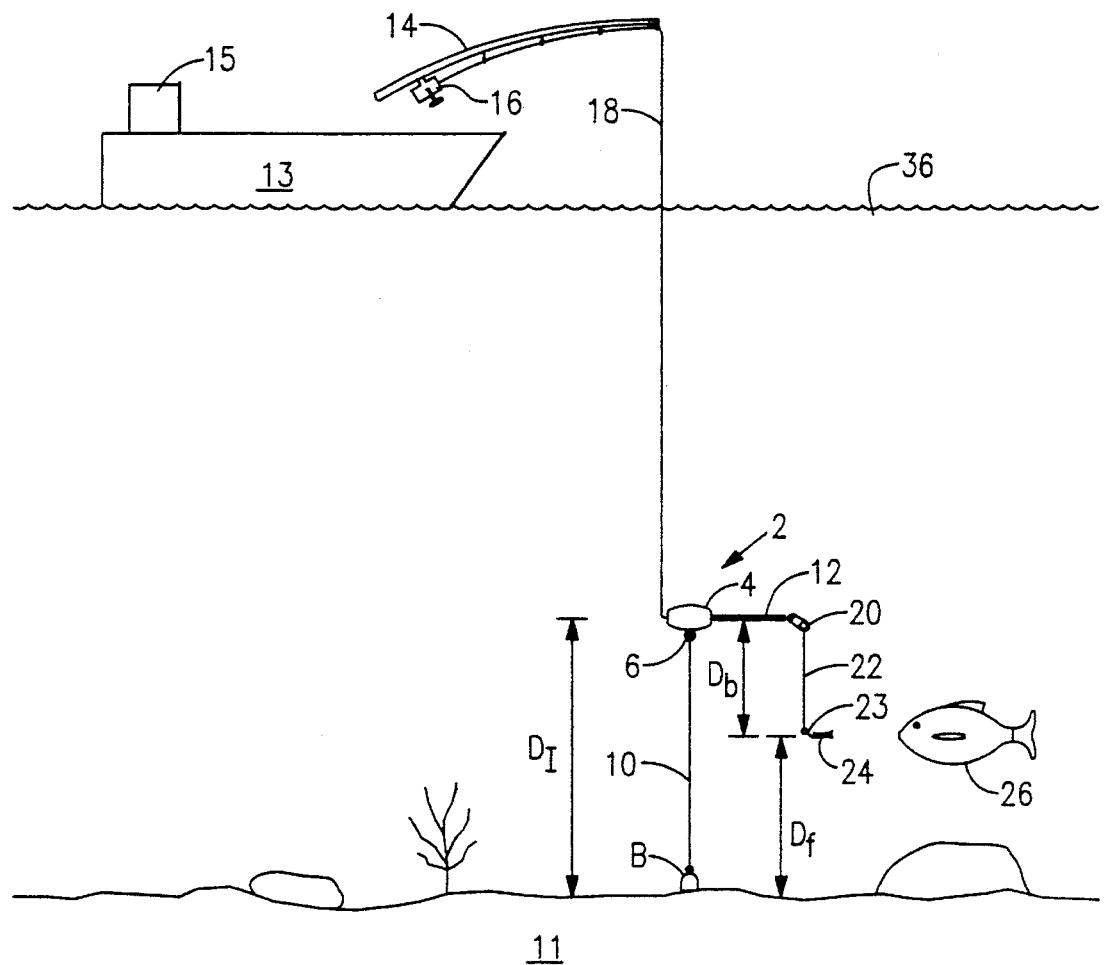
FIG. 1 is a diagrammatic view showing an application of the bait locating device according to the present invention.
Figure 2:
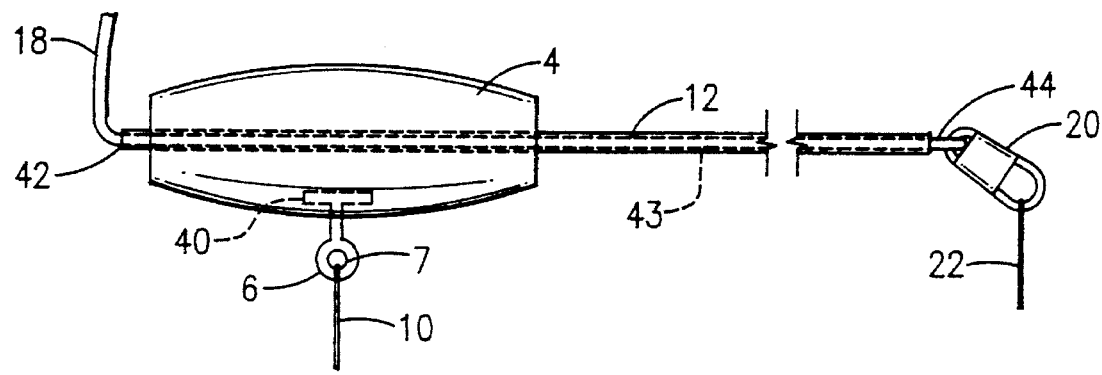
FIG. 2 is a partial enlarge diagrammatic elevational view of the bait locating device of FIG. 1.

Turning now to FIGS. 1 and 2, a detailed description concerning the present invention will now be provided. As can be seen in those figures, the bait locating device 2 includes a floatation member 4 having an eye hook or another similar attachment member 6 securely embedded in or attached to a first lower surface of the floatation member 4 by a suitable anchor 40. As such anchoring techniques are well known in the art a further detailed description concerning the same is now provided herein. A sinker or some other weighted member 8 is attached to the attachment member 6 by a sinker line 10 which has a first end secured to an aperture 7 or some other attachment mechanism of the attachment member 6 while an opposite end of the sinker line 10 is secured to an aperture 9 or some other attachment mechanism of the weighted member 8. The bait locating device 2 further includes a spacer 12 secured to the floatation member 4. The spacer 12, shown in the first few embodiments, is a hollowed tubular spacer (20 gauge) which has first and second opposed apertures 42, 44 interconnected by an elongate passage 43 extending completely therethrough. The first and second apertures 42, 44 and the elongate passage 43 are sized to allow the fishing line 18 to freely pass therethrough. The bait locating device 2 is utilized to properly locate the bait 24 at a desired distance above the bottom 11 of the body of water as will be described in further detail hereinafter.

As can be seen in FIG. 1, a boat 13 is shown floating on the surface of the water 36 and the boat 13 is equipped with sonar or some other similar fish locating device 15 well known in the fishing art. The fish locator device 15 is used to determine the depth at which the fish(es) 26 is located. Once this depth is determined, the fisherman then drops a fishing line 18 using a fishing pole 14 and operating a reel 16 attached thereto. The fishing line 18 extends straight down to the bait locating device 2, through the first aperture 42 and then extends completely through the entire length of the elongate passage 43 and out through the second aperture 44 of the hollow tubular spacer 12. Thereafter, that end of the fishing line 18 remote from the reel 16 is securely fastened to a first end of the swivel 20. The swivel 20 is selected such that it is too large to pass back through the second aperture 44 of the hollow tubular spacer 12, i.e. the swivel 20 has a width larger than the diameter of the second aperture 44 and such engagement functions as a stop. A hook snell 22 is connected to the opposite portion of the swivel 20 and the desired bait 24, e.g. a worm, minnow, etc., is attached to the hook 23 of the hook snell 22.

Once a fisherman determines the distance $D_f$ of the fish 26 from the bottom 11 of the body of water, via the fish locating device 15, the fisherman then selects an appropriate length of sinker line 10 $D_1$ which is dependent upon the length $D_h$ of the employed hook snell 22 and the determined distance of the fish $D_f$ from the bottom 11. For example, if a fish 26 to be caught is located 13 feet above the bottom 11 ($D_f$=13 feet) and the utilized hook snell 22 is 1 foot long ($D_b$=1 foot), then the length of the sinker line 10 is selected to be 14 feet ($D_f$=14 feet), based on the formula $D_f$+$D_b$=$D_t$, that is, 13 feet+1 feet=14 feet. Such arrangement will ensure that the bait 24, during use, is located exactly 13 feet above the bottom 11.

The invention works as follows. The fisherman first passes the fishing line 18 through the two apertures 42, 44 and the passage 43 of the hollow tubular spacer 12 of the bait locating device 2 and then attaches a swivel 20 to the remote end of the fishing line 18. A desired weighted member 8 is secured to the attachment member 6 by sinker line 10 having an appropriate length as determined by the above formula. Next, a desired length hook snell 22 is attached to the swivel 20 and the desired bait 24 is secured to the hook 23 of the hook snell 22. The fisherman then casts or drops the fishing line into the body of water and the weighted member 8 slowly and gradually sinks the bait locating device 2 and the bait 24 toward the bottom 11. By properly selecting the $D_1$ of the sinker line 10, the bait locating device 2 is positioned at a desired distance above the bottom 11, e.g. the length of the sinker line 10, because once the weighted member 8 rests on the bottom and the floatation member 4 attempts to float toward the surface 36 but is restricted by the sinker line 10 and weighted member 8 which counteract the action of the floatation member 4.

The bait locating device 2 is designed so that, during use, the hollow tubular spacer 12 extends substantially parallel to the surface 36 of the water and the bottom 11. Accordingly, the second end of the hollow tubular spacer 12, supporting the swivel 20, is also located at the same distance above the bottom 11 as the floatation member 4, e.g. approximately 14 feet. The bait 24 will then be 1 foot lower as the bait 24 is attached to the opposite end of the 1 foot hook snell 22. Consequently, the bait 24 is located at exactly 13 feet above the bottom 11 which is the precise location where the particular fish 26 to be caught is also located.

An important aspect of the present invention is that the bait locating device 2, when suspended in the water, is positioned such that the hollow tubular spacer 12 is maintained substantially parallel to the surface 36 of the water. This facilitates the sensation felt by the fisherman when the fish 26 grabs or otherwise attacks the bait 24. That is, the fisherman directly and precisely senses when the bait is taken by the fish 26, e.g. typically once a fish 26 grabs the bait, it swims down toward the bottom 11. Such motion of the fish directly tugs on the fishing line 18 and immediately notifies the fisherman that he or she should jerk the fishing pole 14 to ensure that the hook 23 of the hook snell 22 is securely embedded in the mouth of the fish to facilitate reeling in of the fish.

Figure 3:
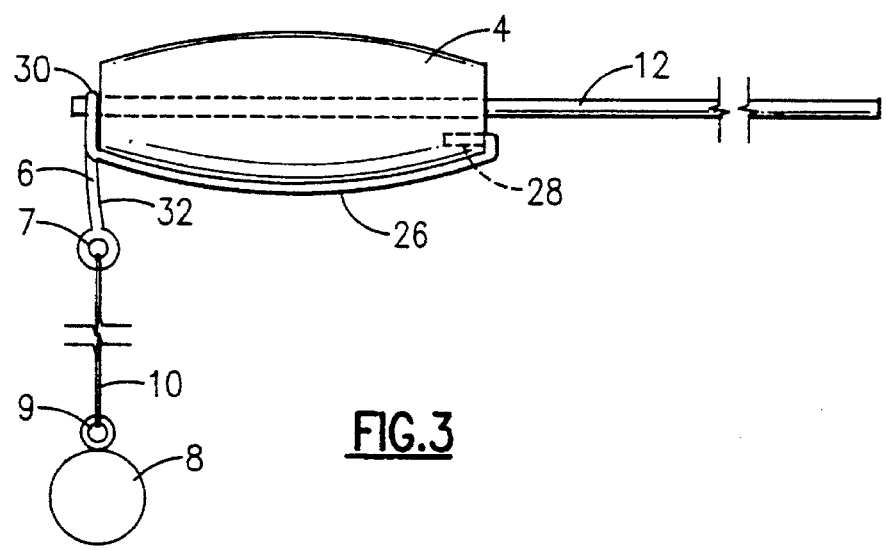
FIG. 3 is a second embodiment of the bait locating device according to the present invention.

Turning now to FIG. 3, a second embodiment of the present invention will not be described in detail. This embodiment is very similar to the first embodiment except that the attachment member 6 has been modified. As can be seen in this figure, a first anchor portion 28 is embedded adjacent a first end of the elongate floatation member 4. The attachment member 6 then follows the exterior contour of the floatation member 4 and toward the opposite end of the floatation member 4 and passes around a first end portion of the hollow tubular spacer 12. Thereafter, the attachment member extends away from the floatation member 4, in a direction perpendicular to the hollow tubular spacer 12, and a remote portion of the attachment member 6 supports an aperture 7 or some other fastening device. The attachment member 6 is preferably manufactured from a malleable rust-resistant material, such as a copper, brass, stainless steel, etc., so as to facilitate desired alignment of the protruding portion 32 of the attachment member 6 relative to the floatation member 4. This enables the fisherman to adjust the alignment of the hollow tubular spacer 12 relative to the surface 36 during use, e.g. the protruding portion 32 can be bent toward the left, as can be seen in FIG. 3, so that the right end portion of the hollow tubular spacer 12 will be biased by the floatation member 4 more toward the surface 36 or the protruding portion 32 can be bent toward the right, as can be seen in FIG. 3, so that the right end portion of the hollow tubular spacer 12 will be biased by the floatation device 4 more toward the bottom 11. In both of the above embodiments of the bait locating device 2, the attachment member 6 is an elongate member which defines an axis and the hollow tubular spacer 12 is an elongate member which also defines an axis and these two axes extend substantially perpendicular to one another.

Figure 4:
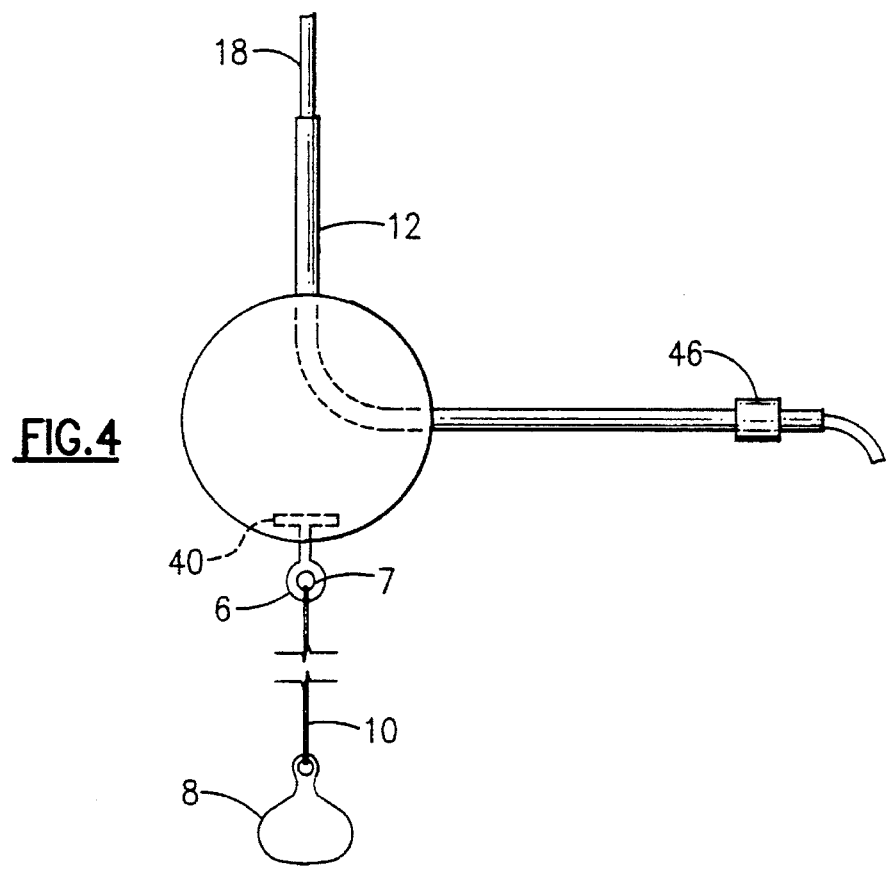
FIG. 4 is a third embodiment of the bait locating device according to the present invention.

Turning now to FIG. 4, a third embodiment of the invention will now be described. In this embodiment, the floatation member 4 is spherical and the hollow tubular spacer 12 is a right angle member having first and second perpendicular aligned portions with a bent tubular portion interconnecting said first portion with second portion. As can be seen in that figure, the attachment member 6 is aligned axially with the first portion of the hollow tubular spacer 12 so that, during use, the weighted member 8, the sinker line 10, the attachment member 6, the first end portion of the hollow tubular spacer 12 and the fishing link 18 are all substantially axially aligned with one another. Such arrangement also facilitates extension of the second portion of the hollow tubular spacer 12 substantially horizontal and parallel to the surface 36 of the water. If desired, a secondary floatation member 46 may be attached to the second portion of the hollow tubular spacer 12 to facilitate proper horizontal alignment of that portion of the spacer 12. The secondary floatation member 46 preferably has an interference fit with the exterior surface of the hollow tubular spacer 12 but is slidable along the exterior surface of the hollow tubular spacer 12 to facilitate proper horizontal alignment of that portion of the hollow tubular spacer 12.

Figure 5:
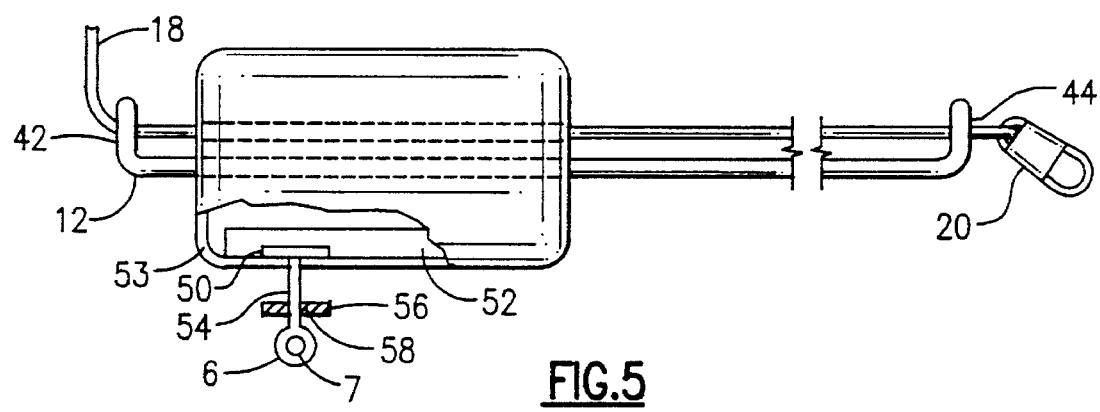
FIG. 5 is a fourth embodiment of the bait locator according to the present invention.

FIG. 5 shows a partial cross sectional view of fourth embodiment of the bait locating device 2 according to the present invention. In this embodiment, the attachment member 6 is adjustable, e.g. is slidable, relative to the floatation member 4 to facilitate proper alignment of the spacer 12 in a substantially horizontal orientation during use. As can be seen in this figure, the attachment member 6 has a lower portion with an aperture 7 provided therein. The opposite end of the attachment member 6 has a head 50 which is slidable within the cavity 52 of the floatation member 4 along an elongate slot 53. The portion of attachment member 6 adjacent the head 50 is provided with an external thread 54 and a nut 56 is provided with a mating interior thread 58. When the nut 56 is loosened, i.e. spaced from the head 50 and the floatation member 4, the head 50 is slidable within the cavity 52 to the desired location. Once the head 50 is appropriately positioned, the nut 56 is tightened so that the side wall of the floatation member 4 is securely clamped between the head 50 and the nut 56 thereby securing the attachment member 6 at a desired location. Such adjustability of the attachment member 6 allows the fisherman to alter the orientation of the spacer 12 relative the surface of the body of water prior to each use.

Any further variation of this embodiment is that the spacer 12 comprises an elongate member, such as a piece of wire, having a first aperture 42 formed adjacent one end thereof and a second aperture 44 formed adjacent an opposite end thereof, and both said first and second apertures are sized to allow a desired fishing line to pass freely therethrough. The spacer 12 is embedded within the floatation member 4 and a through bore 60 extends completely through the floatation member 4 to allow passage of the fishing line 18 therethrough.

The floatation member 4 can have a variety different shapes and/or configurations. The floatation member can be an encapsulated air pocket or it may be a material having a density lighter than water, e.g. cork.

It is to be appreciated that a variety of different arrangements could be used to vary the releasably secured position of the attachment member 6 relative to the floatation member 4. As such variable adjustments are well known in this art, a further detail description concerning the same is not provided herein but all of such adjustments are considered to be within the scope of the present invention. Further, as the floatation member 4 will be suspended within the water during use, it must be sealed so as to be water tight and/or water proof in order for the bait locating device to function properly—if water leaks into the device may not have sufficient buoyancy.

A main purpose of the spacer 12 is to facilitate separating or spacing of the hook snell 22 from the floatation member 4, during use, while also assisting the fisherman with casting the bait to a desired location. The spacer 12 also minimizes the possibility of the bait 24 becoming entangled with the sinker line 10 during a cast or while fishing.

It can be appreciated that size of the bait locating device 2 will vary depending upon the application. If bait 24 is to be attached to the hook snell 22 is relatively large, then at least the size of the floatation member 4 of the bait locating device 2 should be accordingly increased in size so that the bait locating device 2 has sufficient buoyancy to still float to the proper distance above the bottom 11, i.e. the bait locating device 2 must be more buoyant than the employed bait and other associated fishing gear. Alternatively, if smaller bait is employed, then at least the size of the floatation member 4 should accordingly be decreased in size. Depending upon the buoyancy of the bait locating device 2, the weighted member 8 is sized such that it will gradually draw or pull the bait locating device 2 to the bottom 11 while not unduly restricting the reeling in of caught fish 26.

Preferably, the bait locating device 2 is manufactured or molded from a clear plastic material, such as polyester, polyethylene or polyvinyl chloride, or some other similar material. If desired, bait locating device 2 may be painted a color which does not alarm or scare fish during use, e.g. black, blue or white.

It is anticipated that the spacer 12 will have a length of between approximately 2 and 24 inches, preferably have a length of between 4 and 18 inches and most preferably have a length of between 5 and 9 inches.

It has been the inventor's experience that by properly positioning the bait 24 at the exact location where the fish 26 are located, this significantly increases the amount of fish caught while minimizing the effort required to catch such fish.

The sinker line 10 is chosen such that the sinker line 10 is weaker than the fishing line 18. This ensures that if the weighted member 8 becomes caught or otherwise entangled with the bottom 11 for some reason, the sinker line 10 will be prone to break and allow the remaining fishing gear, i.e. the fishing line 18, the bait locating device 2, the swivel 20, the hook snell 22 and/or the bait 24, to be reeled in by the fisherman.

Since certain changes may be made in the above bait locating device, without departing from the spirit and scope of the invention herein involved, it is intended that all matter contained in the above description or shown in the accompanying drawings shall be interpreted merely as examples illustrating the inventive concept herein and shall not be construed as limiting the invention.

Wherefore, I claim:

1. A bait locating device for facilitating positioning of bait at a desired distance from a bottom of a body of water, said bait locating device comprising:

a floatation member for providing desired buoyancy to said bait locating device;

an attachment member being secured to said floatation member, said attachment member facilitating attachment of said bait locating device to a desired weighted member for sinking said bait locating device toward the bottom of the body of water; and a spacer comprising first and second apertures which are both supported by said floatation member, said spacer having a longitudinal dimension which is at least twice that of a longitudinal dimension of said floatation member, and said spacer being supported by said floatation member so that, said second aperture is spaced a greater distance from an exterior surface of said floatation member than said first aperture whereby said second aperture, when engaged with a fishing line during use, spaces the fishing line a desired distance away from said floatation member.

2. A bait locating device according to claim 1, wherein said attachment member and said spacer are attached to said floatation member in a manner such that at least a portion of said spacer supporting said second aperture extends in a horizontal direction substantially parallel to a surface of the body of water when said bait locating device is suspended in water during use.

3. A bait locating device according to claim 2, wherein said first and second apertures are both sized to allow a desired fishing line to pass freely therethrough.

4. A bait locating device according to claim 1, wherein said bait locating device further comprises a mechanism for varying at least one of a position and an orientation of said attachment member relative to said floatation member to facilitate parallel alignment of at least a second portion of said spacer relative to a surface of the body of water during use.

5. A bait locating device according to claim 1, wherein said attachment member comprises a first portion which is embedded within said floatation member and a second remote portion extending from said floatation member which has an aperture formed therein for facilitating attachment of said bait locating device to the weighted member via a fishing line.

6. A bait locating device according to claim 1, wherein said spacer supports a slidable second floatation member for facilitating positioning of a second portion of said spacer in a direction substantially parallel to a surface of the body of water during use.

7. A bait locating device according to claim 1, wherein said spacer has a longitudinal dimension of between two and twenty-four inches.

8. A bait locating device according to claim 1, wherein said attachment member is an elongate member which defines an axis and said spacer is an elongate member which defines an axis and said axis of said attachment member extends substantially perpendicular to said axis of said spacer.

9. A bait locating device according to claim 1, wherein said floatation member has an elongate through bore extending therethrough and an intermediate portion of said spacer is located within said elongate through bore and secured to said floatation member, and said though bore is also sized to allow a fishing line to pass therethrough adjacent said spacer.

10. A bait locating device according to claim 9, wherein said floatation member includes an elongate slot and the attachment member is slidable along the elongate slot and securable at a desired position along the elongate slot to facilitate extension of said spacer substantially parallel to a surface of the body of water when said bait locating device is suspended in water during use.

11. A bait locating device for facilitating positioning of bait at a desired distance from a bottom of a body of water, said bait locating device comprising:

a floatation member for providing desired buoyancy to said bait locating device;

an attachment member being secured to said floatation member, said attachment member facilitating attachment of said bait locating device to a desired weighted member for sinking said bait locating device toward the bottom of the body of water; and a spacer having a first portion defining a first aperture which is engagable with a fishing line, said first portion being attached to said floatation member, said spacer having a second portion extending away from said floatation member, said second portion defining a second aperture which is engagable with a fishing line for spacing the fishing line from said floatation member during use, wherein said spacer comprises a hollow elongate tubular member which has an elongate passage communicating with said first and second apertures, and said elongate passage and said first and second apertures are all sized to allow a desired fishing line to pass freely therethrough.

12. A bait locating device according to claim 11, wherein said first aperture is located adjacent a first surface of said floatation member while said second aperture is spaced a distance of at least two inches from a second surface of said floatation member.

13. A bait locating device according to claim 4, wherein the hollow tubular member comprises a first portion and a second portion, and said first and second portions form a right angle with one another and a bent tubular portion interconnects said first portion with said second portion.

14. A bait locating device in combination with a weighted member for facilitating positioning of bait at a desired distance from a bottom of a body of water, said bait locating device comprising:

a floatation member for providing desired buoyancy to said bait locating device;

an attachment member being securing to said floatation member;

a fishing line interconnecting said attachment member with a weighted member for sinking said bait locating device toward the bottom of the body of water; and a spacer having a first portion attached to said floatation member and a second portion extending away from said floatation member, said first and second portions having means which are engagable with a fishing line for spacing the fishing line from said floatation member, during use.

15. The combination according to claim 14, wherein said first portion has a first aperture and said second portion has a second aperture and said first and second apertures are both sized to allow a desired fishing line to pass freely therethrough; and said floatation member has a through bore extending therethrough which facilitates passage of the fishing line through the floatation member.

16. The combination according to claim 14, wherein said spacer comprises a hollow elongate tubular member extending longitudinally through said floatation member, said hollow elongate tubular member has an elongate passage extending therethrough which is sized to allow a fishing line to pass freely therethrough.

17. The combination according to claim 14, wherein said spacer has a length of between 2 and 24 inches.

18. A method of facilitating positioning of bait at a desired distance from a bottom of a body of water, said method comprising the steps of:

providing a bait locating device with a floatation member for supplying desired buoyancy of said bait locating device;

securing an attachment member to said floatation member;

attaching a desired weighted member to said attachment member, via a fishing line of a desired length, for sinking said bait locating device toward the bottom of the body of water;

connecting a first portion of a spacer to said floatation member and extending a second portion of the spacer away from said floatation member; and engaging said first and second portions of the spacer with a fishing line for spacing the fishing line from said floatation member, during use.

19. A method according to claim 18, further comprising the steps of:

securing a swivel to a remote end of the fishing line; attaching a hook snell, with a hook, to the swivel; attaching a desired bait to the hook; and placing said bait locating device and the bait in a desired body of water.

* * * * *